Patented July 13, 1926.

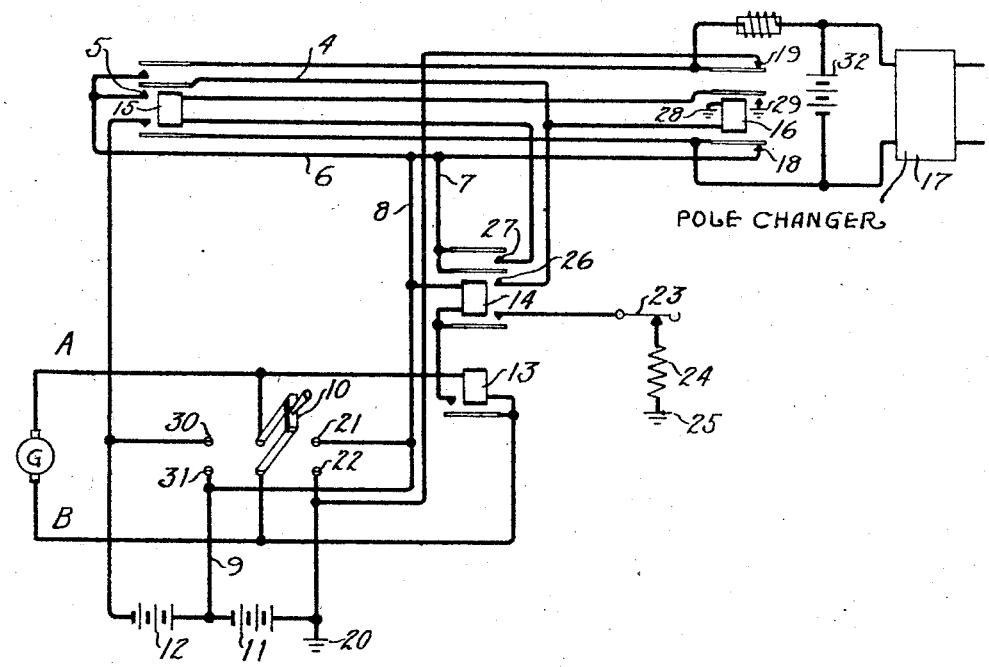

1,592,232

UNITED STATES PATENT OFFICE.

WILLIAM M. STUART, OF CHATHAM, NEW JERSEY, ASSIGNOR TO WESTERN ELECTRIC COMPANY, INCORPORATED, OF NEW YORK, N. Y., A CORPORATION OF NEW YORK.

SWITCHING SYSTEM.

Application filed October 16, 1924. Serial No. 743,916.

This invention relates to ringing systems and more particularly to telephone systems wherein pole changers are employed in association with a plurality of central office storage batteries, to supply the usual ringing current for the system.

The object of this invention is to automatically transfer a pole changer or other device from a battery which is to be charged to a battery not being charged.

A feature of the invention resides in the provision of a relay arrangement whereby upon the operation of a charging switch the battery to be charged is automatically disconnected from an associated pole changer or other device, and in its stead another battery not being charged is immediately connected. This prevents the transmission of an alternating current beyond the usual allowable voltage limits, which would be the case if the pole changer were connected to the high voltage current of a battery under charge.

Another feature resides in the sequence of operation and release of the relays employed to prevent the short circuiting of either the central office or noise killing batteries.

Other features including provision for normally operating the pole changer from any predetermined desirable source will appear from the following detailed description in conjunction with the accompanying drawing, which illustrates a preferred embodiment of the invention.

A and B represent conductors leading from a charging machine G and, depending upon the position of charging switch 10, serve to connect either of batteries 11 or 12 to said charging means.

Assuming that neither of the batteries are under charge, and that all relays are in non-operated condition, the pole changer or other device 17 will then normally operate from central office battery 11 which is assumed to be of larger capacity than battery 12, in the following circuit: grounded battery, contacts 18 of relay 16, through interruption means 17, contacts 19 back to ground 20.

If, however, it be desired to charge battery 11, switch 10 is thrown to the right thus closing contacts 21 and 22. Relay 13 will operate when charging current is connected to conductors A and B, since it is directly connected across the line. It should be noted that with the switch 10 thrown to the right, ground at 20 will be connected to the armature of relay 13 in an obvious path. This in turn will furnish ground and cause the operation of relay 14 over the following circuit: battery, conductors 9 and 8, winding of relay 14, armature of relay 13, through the charging switch and contacts 22 to ground at 20. Relay 14 upon energizing, closes a locking circuit for itself from battery 11, conductors 9, 8, winding and lower armature of relay 14, key 23, and resistance 24 to ground 25. Relay 14 in operating also closes its upper contacts 26 and 27. Upon the closing of contacts 26, relay 16 will operate in a circuit from battery 11, conductors 9, 8, 7, contacts 26 of relay 14, and winding of relay 16 to ground 28. The operation of relay 16 causes relay 15 to operate in a circuit from battery, conductors 9, 8, and 7, contacts 27 of relay 14, winding of relay 15, inner upper contacts of relay 16 to ground 29. The operation of relay 15 locks relay 16 independent of relay 14 as fol'ows: battery, conductors 9, 8, 6, upper inner contact 5 of relay 15, conductor 4 and winding of relay 16 to ground 28. Relays 15 and 16 are now operated and serve the following functions: Relay 16 by breaking its contacts 18 and 19 disconnects pole changer 17 from battery 11, which is now being charged; and relay 15, by attracting its outer armatures, connects the pole changer to battery 12, in an obvious circuit.

It should be observed therefore, that upon the connection of battery 11 to the charging machine, the pole changer is disconnected therefrom, and immediately connected to another battery, 12, not under charge.

Assuming, that battery 11 has been under charge and it is then desired to charge battery 12. It would therefore be desirable to disconnect the charging machine from battery 11, connect it to battery 12, and at the same time to disconnect pole changer from battery 12 and connect it to battery 11.

The charging switch 10 would thereupon be thrown to the left to close its contacts 30 and 31. It should be noted that all relays are still energized. However, with the switch thrown to the left, battery instead of ground will be connected through one side of the charging switch, and the armature and contacts of relay 13, to the lower terminal of relay 14. Relay 14 is thereby short circuited in an obvious circuit and will release. Resistance 24 functions to prevent battery 11 from being short circuited during the interval between the closure of the charging switch contacts 31 and the release of relay 14. Upon the release of relay 14 its previously traced locking circuit will be broken. Upon the release of relay 14, contacts 26 and 27 will open and the battery connection to relay 15 will be broken. Relay 15 will therefore release and open at its outer armature contacts, the connection between battery 12 and the pole changer. Relay 15 upon deenergizing also causes its upper inner armature to retract, whereupon the locking circuit for relay 16, hereinbefore traced, will be broken. Relay 16 will then release and at once reconnect the pole changer to battery 11 at its contacts 18 and 19. During the time interval between the release of relay 15 which disconnects the pole changer from battery 12 and the release of relay 16, the pole changer operates from noise killing battery 32.

After battery 12 has been sufficiently charged, the charging switch may be opened and the pole changer will continue to operate from battery 11, unaffected by the opening of the switch.

Assuming that battery 11 has been under charge for a desired length of time and it is now desired to operate the pole changer from this battery. As described above, if the switch were thrown to the left to put battery 12 under charge, all relays would be released and the pole changer would be automatically disconnected from battery 12 and connected to battery 11. However, inasmuch as it may not always be desirable or necessary to put battery 12 under charge at this time, battery 11 may be reconnected to the pole changer by merely throwing the switch from the right, its position when battery 11 is being charged, to a neutral position and by actuating key 23. Relay 14 will thus be released which in turn releases relays 15 and 16. The release of relays 15 and 16 as above described, disconnects battery 12 and connects battery 11.

What is claimed is:

1. In a switching system a plurality of current sources, an electroresponsive device, a switching device, means for automatically connecting said electroresponsive device to one of said current sources, responsive to the connection of said switching device with another of said current sources, and means independent of said switching device comprising a manually operable key for connecting said electroresponsive device to a predetermined one of said current sources.

2. In combination, a plurality of current sources adapted to be connected to an electroresponsive device, switching means adapted to connect any one of said current sources to a source of charging current and for assuring the connection of said electroresponsive device to one of said current sources not connected to said charging source, and means independent of said switching device comprising a manually operable key for connecting said electroresponsive device to a predetermined one of said current sources.

3. In a ringing system, a plurality of sources of current, a ringing machine normally connected to and operating from a first one of said sources, a switch adapted to connect a second one of said sources with any of the other of said sources, means automatically responsive to the connection of said second source with said first source to switch said ringing machine from said first source to a third one of said sources, and other means for releasing said automatic means to disconnect said third source and to reconnect said ringing machine to said first source effective upon the disconnection of said second source from said first source.

In witness whereof, I hereunto subscribe my name this 10th day of October A. D., 1924.

WILLIAM M. STUART.